US009717369B2

(12) United States Patent
Cheung et al.

(10) Patent No.: US 9,717,369 B2
(45) Date of Patent: Aug. 1, 2017

(54) HAND-HELD BLENDER

(71) Applicant: Huiyang Allan Plastic & Electric Industries Co., Limited, Huizhou (CN)

(72) Inventors: Shu Sang Cheung, Hong Kong (HK); Xianliang Ouyang, Huizhou (CN)

(*) Notice: Subject to any disclaimer, the term of this patent is extended or adjusted under 35 U.S.C. 154(b) by 369 days.

(21) Appl. No.: 14/590,354

(22) Filed: Jan. 6, 2015

(65) Prior Publication Data

US 2016/0100716 A1    Apr. 14, 2016

(30) Foreign Application Priority Data

Oct. 8, 2014 (CN) .......................... 2014 1 0523419

(51) Int. Cl.
*A47J 43/044* (2006.01)

(52) U.S. Cl.
CPC .... *A47J 43/044* (2013.01); *A47J 2043/04409* (2013.01); *A47J 2043/04427* (2013.01)

(58) Field of Classification Search
CPC .................................................... A47J 43/044
USPC ................. 366/129, 206, 294, 601
See application file for complete search history.

(56) References Cited

U.S. PATENT DOCUMENTS

| 1,598,185 | A | * | 8/1926 | Willard | 134/107 |
| 1,707,550 | A | * | 4/1929 | Gould | A47J 43/07 248/507 |
| 1,823,314 | A | * | 9/1931 | Brewer | A47J 43/046 366/205 |
| 2,917,929 | A | * | 12/1959 | Sprague | A47J 43/085 192/108 |
| 3,951,351 | A | * | 4/1976 | Ernster | A47J 43/087 241/101.1 |
| 4,197,019 | A | * | 4/1980 | Schold | B01F 3/1221 366/294 |
| 5,368,384 | A | * | 11/1994 | Duncan | A47J 43/044 219/227 |
| 2004/0141411 | A1 | * | 7/2004 | Huang | A23G 9/12 366/204 |
| 2015/0375184 | A1 | * | 12/2015 | Cheung | B01F 13/002 366/129 |

* cited by examiner

*Primary Examiner* — David Sorkin
(74) *Attorney, Agent, or Firm* — Prakash Nama; Global IP Services, PLLC

(57) ABSTRACT

The invention discloses a hand blender with a body which can be connected with different stirring tools. The body includes a motor with an output shaft, a deceleration component and a plurality of output connectors. The speed control knob and the safety switch, starting switch which control the moving of the motor are set up of the body. The control circuit includes a half speed control lever and a reverse control lever which can be moved by the corresponding stirring tools. The hand blender can connected with different stirring tools and output different kinds of speeds. It is more convenient and safe.

8 Claims, 7 Drawing Sheets

HAND-HELD BLENDER

BACKGROUND OF THE INVENTION

1. Field of the Invention

The present invention relates to the field of food blending machine, in particular to a hand-held blender which can joint with different stirring parts and output different kinds of speed.

2. Description of Related Art

Generally hand blender including a body and a stirring tool which is connected with the body. Traditional stirring tool cannot separate from the body of the hand blender. It's difficult for cleaning as an entirety, and its function is single. Although some blenders can separate the stirring tool from the body to connect with different tools for other function, different tools need different speed, it is hard to meet varied needs with a single machine.

BRIEF SUMMARY OF THE INVENTION

The object of the present invention is to provide a hand-held blender, which can solve the problems of the existing blender, such as single function, loud noise, and complex manner of speed conversion.

A hand blender includes at least two different stirring tools and a body capable of detachable connecting with the at least two different stirring tools. The body includes a motor with an output shaft, a high speed output connector fixedly connected to the output shaft and configured to be driven by the output shaft, a low speed output connector with a central hole which permits the high speed output connector and the output shaft to pass through, and a deceleration component coaxially arranged on the output shaft via a one way bearing and configured for outputting a lower speed than the output shaft to the low speed output connector. Each of the at least two different stirring tools can engages with a corresponding one of the high speed output connector and the low speed output connector.

Preferably, the body further includes a control circuit of the motor, the control circuit comprising a reverse speed control switch, and a reverse control lever configured substantially parallel with the output shaft, with one end configured near the reverse speed control switch and the other end configured close to the mounting position of the at least two different stirring tools. The reverse control lever can move along a direction parallel with the output shaft to trigger the reverse speed control switch to control the motor to rotate inversely. One of the at least two different stirring tools can lift the reverse control lever to trigger the reverse speed control switch when the one of the at least two different stirring tools is connected to the body.

Preferably, the control circuit of the motor further includes a half speed control switch for controlling the motor to output a half of its rated power, and the body further comprises a half speed control lever configured substantially parallel with the output shaft. One end of the half speed control lever is configured near the half speed control switch and the other end of the half speed control lever is configured close to the mounting position of the at least two different stirring tools. The half speed control lever can move along a direction parallel with the output shaft to trigger the half speed control switch. One of the half speed control lever and the reverse control lever is more close to the output shaft than the other; one of the at least two different stirring tools can lift the half speed control lever to trigger the half speed control switch when the one of the at least two different stirring tools is connected to the body.

Preferably, the switches comprises a safety switch and a starting switch; the safety switch and the starting switch are connect in series between a power supply and the motor; only when both the safety switch and the starting switch are pressed, the motor is powered to operate.

Preferably, an inner ring of the one way bearing engages with the output shaft, and an outer ring of the one way bearing engages with the deceleration component.

Preferably, the deceleration component includes a planetary gear set comprising a plurality of planet wheels, a sun gear with an inner ring engaging with the outer ring of the one way bearing, and an outer ring engaging with the plurality of planet wheels of the planetary gear set, and an upper planet carrier and a lower planet carrier cooperated to receive the planetary gear set and transmit rotation to the low speed output connector. The lower planet carrier is fixedly connected to the low speed output connector.

Preferably, the lower planet carrier and the low speed output connector are integrated together; the lower planet carrier is configured at an upper end of the low speed output connector.

Preferably, a bearing is sleeved on an outside surface of the sun gear to make the sun gear, the planetary gear set and the planet carrier coaxial.

Preferably, the at least two stirring tools is chosen from an egg beater, a potatoes blender, a chopper and a blender.

The present invention relate to a hand blender, when connects with different stirring tool, it can change speeds conveniently and reliably in a manner with a half speed control lever and a reverse control lever. The invention outputs at least two kinds of speed in a hand-held blender for the installation of the deceleration component. The stirring tool could be egg beater, potatoes blender, chopper or blender. It is multifunctional and saves lots of space with compact structure and small volume. The housing can separate from the stirring tool to connect with different tool and it makes the operation and cleaning easier. The safe switch improves security for user.

BRIEF DESCRIPTION OF THE SEVERAL VIEWS OF THE DRAWING(S)

The foregoing and other exemplary purposes, aspects and advantages of the present invention will be better understood in principle form the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
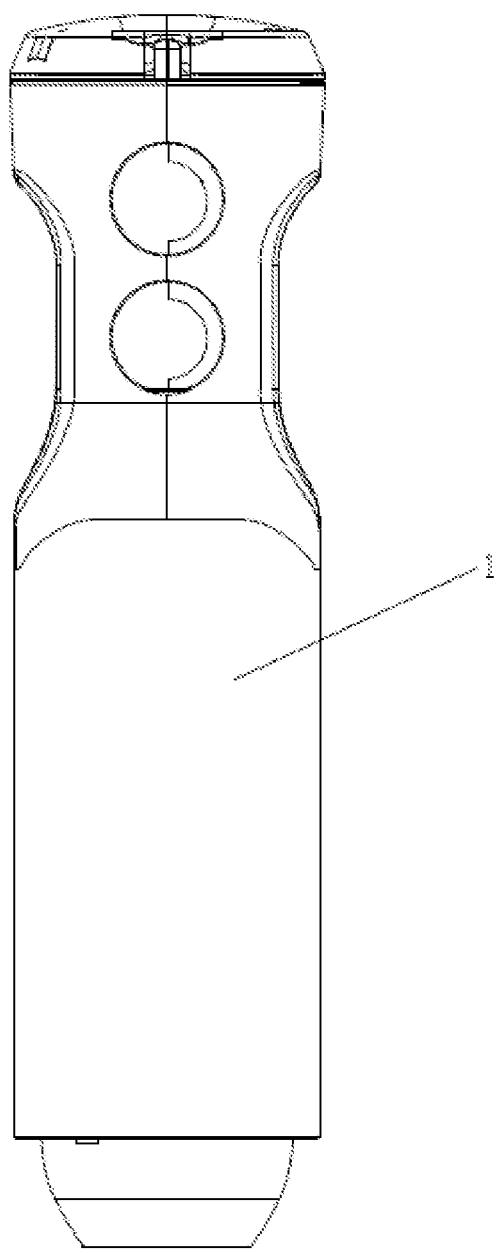
FIG. 1 is a perspective view of a hand blender of the present invention.
Figure 2:
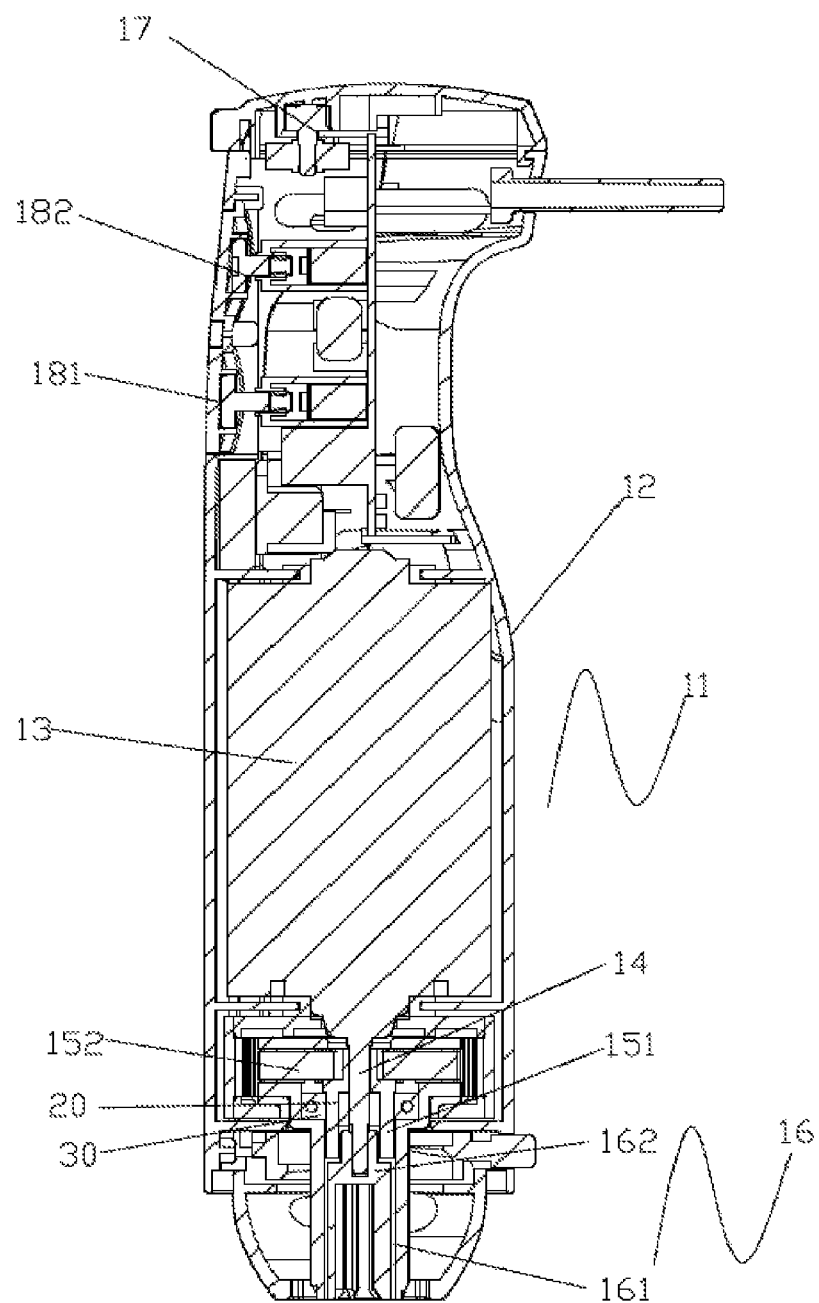
FIG. 2 is a cross-sectional view of a hand blender of the present invention.
Figure 3:
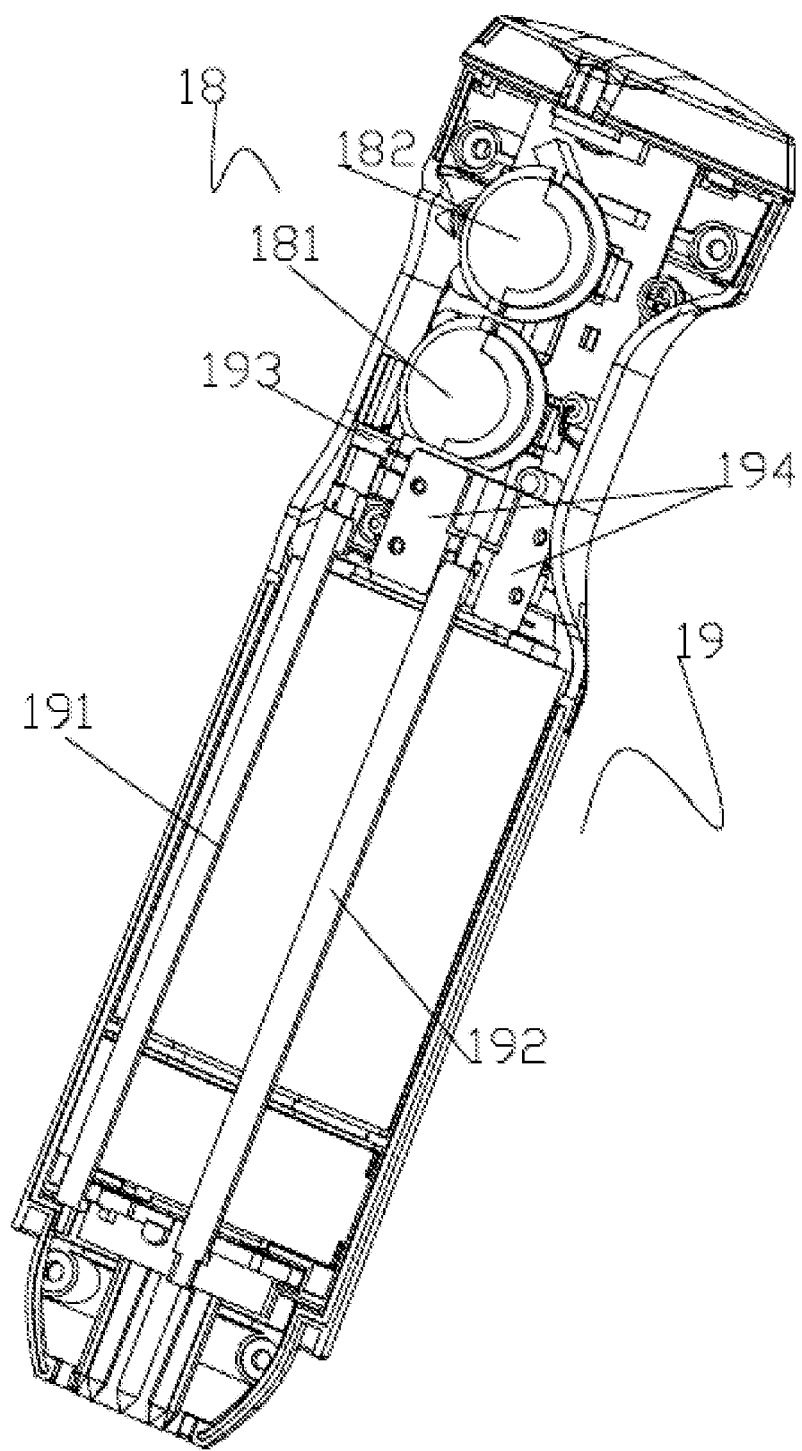
FIG. 3 is a cut-away view of the hand blender of FIG. 2.
Figure 4:
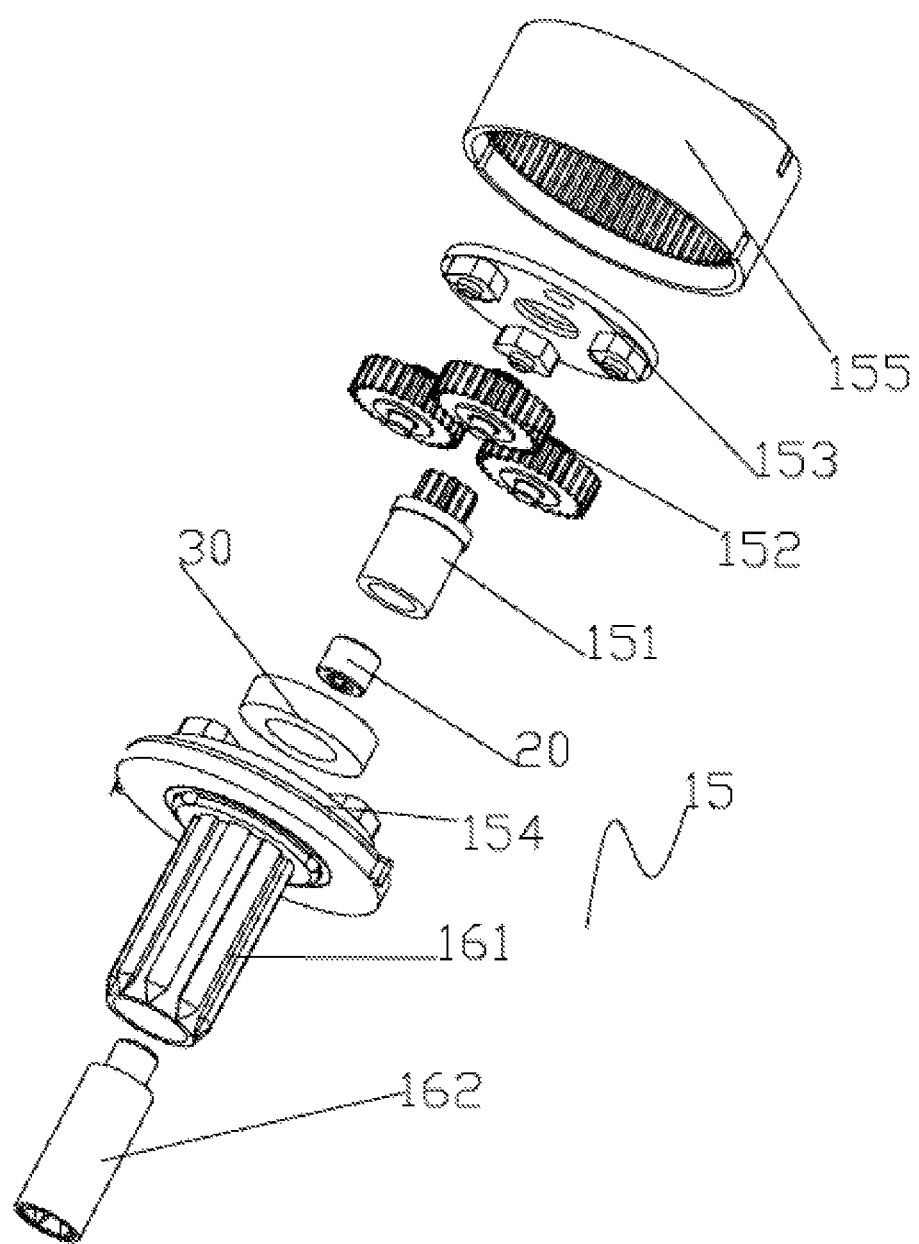
FIG. 4 is an exploded view of a part of a hand blender of the present invention.
Figure 5:
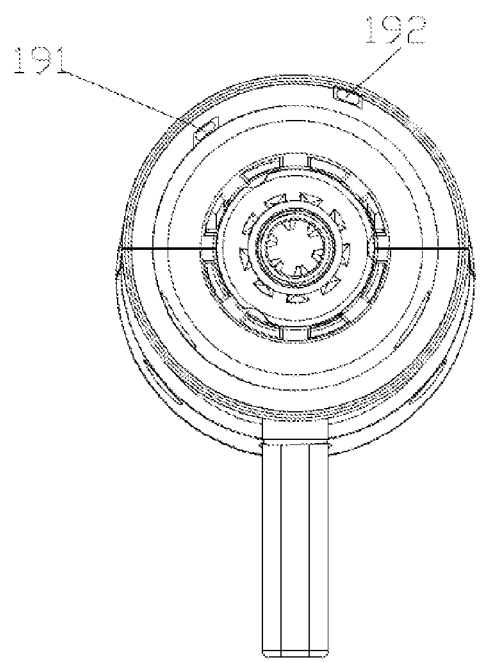
FIG. 5 is a perspective view of the hand blender from another view.
Figure 6:
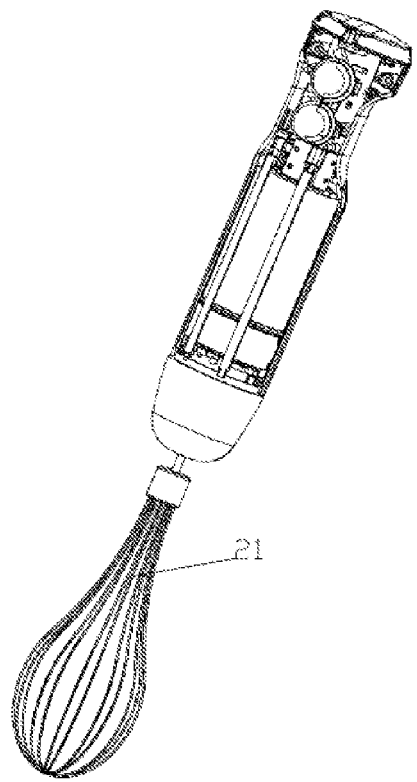
FIG. 6 is a cut-away view of a hand blender with an egg beater of the present invention.
Figure 7:
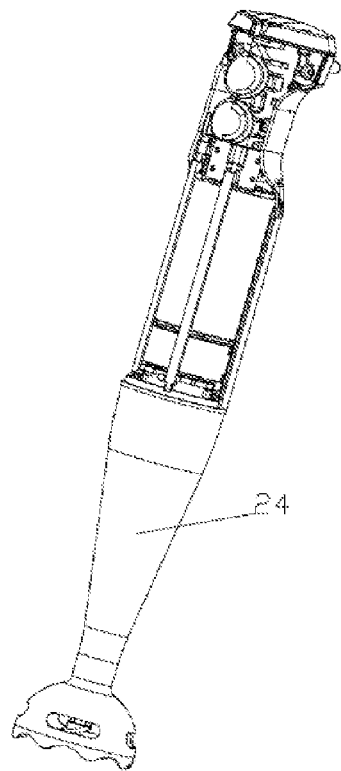
FIG. 7 is a cut-away view of a hand blender with a blender of the present invention.
Figure 8:
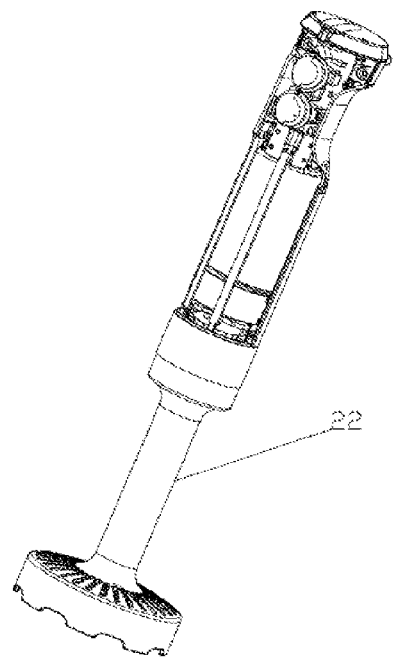
FIG. 8 is a cut-away view of a hand blender with a potatoes blender of the present invention.
Figure 9:
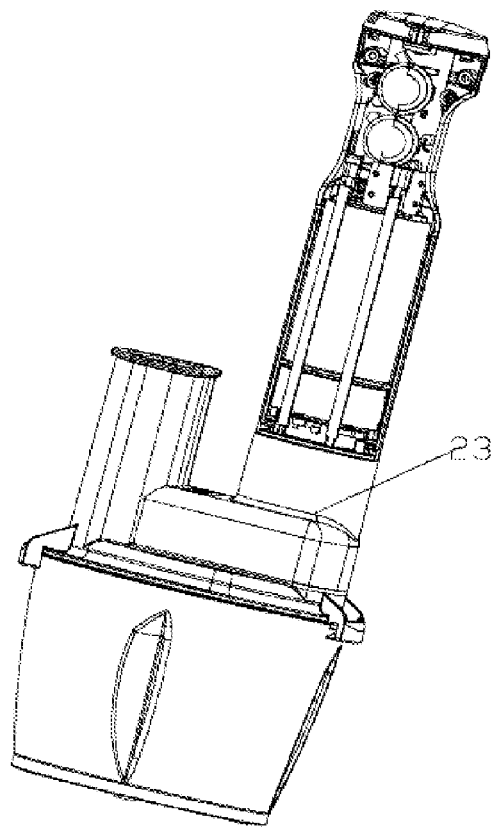
FIG. 9 is a cut-away view of a hand blender with a chopper of the present invention.
Figure 10:
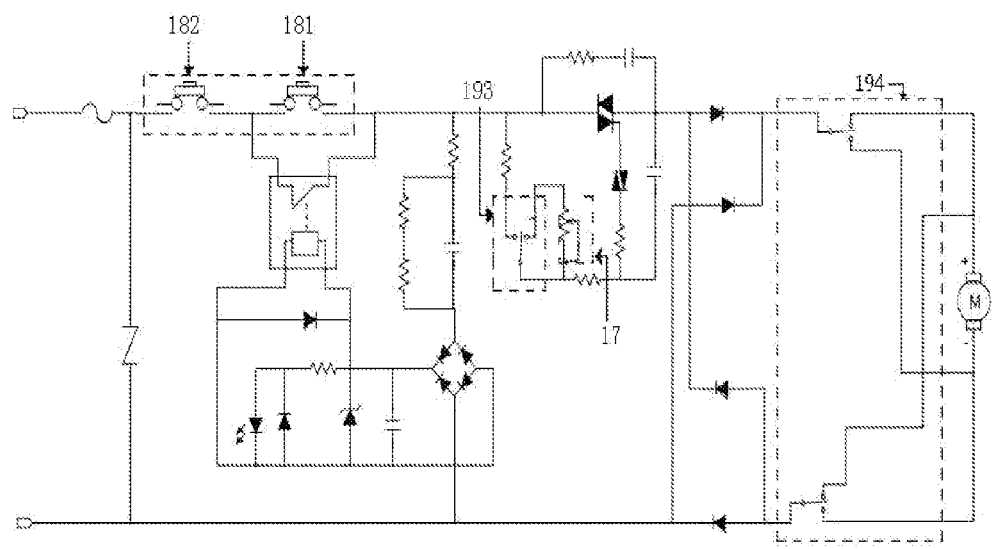
FIG. 10 is a switching circuit of a hand blender of the present invention.

Referring to FIGS. 1, 2 and 3, a hand blender includes a body 1 which can be detachably connected with several different stirring tools. The stirring tools may include an egg beater 21, a potatoes blender 22, a chopper 23 and a blender 24 (please see FIGS. 6, 7, 8 and 9). The body 1 includes a housing 12 receiving a motor 13 with an output shaft 14, a deceleration component 15 which is coaxially arranged at the output shaft 14, an output connector 16, a control circuit 19, two switches 18 and a speed control knob 17 configured on the body 1.

The control circuit 19 includes a half speed control lever 191 and a reverse control lever 192 which are rod structures and parallel with the output shaft 14. The half speed control lever 191 and the reverse control lever 192 are not the same far from the output shaft 14. A half speed control switch 193 connects with the upper end of the half speed control lever 191 and a reverse control switch 194 connects with the upper end of the reverse control lever 192. It would work differently when the body 1 connects with different stirring tools which may trigger different control levers.

The switches 18 include a safety switch 181 and a starting switch 182. The safety switch 181 and starting switch 182 are connect in series between a power supply and the motor. Only when both the safety switch and the starting switch are pressed, the motor is powered to operate.

The deceleration component 15 includes a planetary gear set 152 composed of several planet wheels, a sun gear 151, an upper planet carrier 153 and a lower planet carrier 154 cooperated to receive the planetary gear set 152 and connected with the planetary gear set 152. The deceleration component 15 further includes an inner case 155 fixedly connected with the housing of the body. The inner case 155 is used for receiving a one way bearing 20, a bearing 30, the sun gear 151, the planetary gear set 152, and the upper and lower planet carriers 153, 154. The sun gear 151 has an inner ring engaged with an outer ring of the one way bearing 20, and an outer ring engaged with the plurality of planet wheels of the planetary gear set 152. Several embossments are arranged at the upper planet carrier 153 and the lower planet carrier 154, and are configured to limit the planet wheels of the planetary gear set 152 at fixed positions relative to the upper and lower planet carriers 153, 154. The bearing 30 is sleeved on an outside surface of the sun gear 151 to make the sun gear, the planetary gear set and the planet carrier coaxial.

The output connector 16 includes a low speed output connector 161 which is set under the low planet carrier, and a high speed output connector 162 which is coaxially and fixedly sleeved on the output shaft 14. The low speed output connector 161 defines a central hole which permits the high speed output connector 162 and the output shaft to pass through. The high speed output connector 162 is located inside the low speed output connector 161. The lower planet carrier 154 and the low speed output connector 161 are integrated together, and the lower planet carrier is configured at an upper end of the low speed output connector.

The one way bearing 20 is coaxially arranged on the output shaft 14. The inner ring of the one way bearing 20 engages with the output shaft 14, and the outer ring of the one way bearing 20 engages with the inner ring of the sun gear 151. When the motor 13 works to drive the output shaft 14 to rotate clockwise, because of the one way bearing 20, the sun gear 151 rotates clockwise along with the output shaft 14 and brings the planetary wheels rotating. The planetary wheels bring the upper and lower planet carriers 153, 154 rotating. Thus, the low speed output connector 161 integrated with the lower planet carrier 154 rotates to output a low speed. When the motor 13 works to drive the output shaft 14 to rotate anticlockwise, the one way bearing 20 goes freely, the output shaft 14 cannot bring the sun gear 151 running via the one way bearing 20, and the high speed output connector 162 which connects with the output shaft 14 directly rotates and output a high speed.

In the embodiment, the body 1 can connect with different stirring tools as following:

(1) when the body 1 connects with an egg beater, the half speed control lever 191 is raised (triggered) by the egg beater, and goes up to touch the half speed control switch 193. The motor 13 operates to rotate the output shaft 14 clockwise and provides half power. The half power is transmitted by the deceleration component 15 to the low speed output connector 161, thus a lowest speed is outputted;

(2) when the body 1 connects with a potatoes blender or a chopper, non of the control levers is contacted, raised and triggered, the motor 13 rotate clockwise, the full power of the motor 13 is transmitted by the output shaft 14, the deceleration component 15 to the low speed output connector 161, thus a low speed (a middle speed when compared with the lowest speed described above) is outputted; under this condition, a speed control knob can be used to control speed;

(3) When the body 1 connects with a blender, the reverse control lever is raised (triggered), and goes up to touch the reverse control switch 194. The motor 13 runs reverse, the output shaft 14 rotates anticlockwise, the power is transmitted to the high speed output connector 162 directly, thus a high speed is outputted. The speed control knob can also be used to control speed under this condition.

The present invention utilize a half speed control lever and a reverse control lever, when the body connects to different stirring tools, corresponding output speeds are chosen automatically. The invention outputs at least two kinds of speed in a hand-held blender for the installation of the deceleration component. The stirring tool could be an egg beater, a potatoes blender, a chopper or a blender. It is multifunctional and saves lots of space with compact structure and small volume. The body can separate from the stirring tool to connect with different tools and it makes the operation and cleaning easier. The safe switch improves security for user.

While the invention has been described in terms of several exemplary embodiments, those skilled on the art will recognize that the invention can be practiced with modification within the spirit and scope of the appended claims. For example, the half speed control lever and the half speed control switch can be omitted, and the hand blender can only output two speeds. In addition, it is noted that, the Applicant's intent is to encompass equivalents of all claim elements, even if amended later during prosecution.

What is claimed is:

1. A hand blender, comprising:
   at least two different stirring tools; and
   a body capable of detachable connecting with the at least two different stirring tools, the body comprising:

a motor with an output shaft;

a high speed output connector fixedly connected to the output shaft and configured to be driven by the output shaft;

a low speed output connector with a central hole which permits the high speed output connector and the output shaft to pass through; and a deceleration component coaxially arranged on the output shaft via a one way bearing and configured for outputting a lower speed than the output shaft to the low speed output connector;

each of the at least two different stirring tools are capable of engaging with a corresponding one of the high speed output connector and the low speed output connector;

wherein the deceleration component comprises a planetary gear set comprising a plurality of planet wheels; a sun gear with an inner ring engaging with an outer ring of the one way bearing, and an outer ring of the sun gear engaging with the plurality of planet wheels of the planetary gear set; and an upper planet carrier and a lower planet carrier cooperated to receive the planetary gear set and transmit rotation to the low speed output connector; the lower planet carrier is fixedly connected to the low speed output connector.

2. The hand blender of claim 1, wherein the body further comprising:

a control circuit of the motor, the control circuit comprising a reverse speed control switch; and a reverse control lever configured substantially parallel with the output shaft, with one end configured near the reverse speed control switch and the other end configured close to the mounting position of the at least two different stirring tools;

wherein the reverse control lever is capable of moving along a direction parallel with the output shaft to trigger the reverse speed control switch to control the motor to rotate inversely, wherein one of the at least two different stirring tools is capable of lifting the reverse control lever to trigger the reverse speed control switch when the one of the at least two different stirring tools is connected to the body.

3. The hand blender of claim 2, wherein the control circuit of the motor further comprises a half speed control switch for controlling the motor to output a half of its rated power, and the body further comprises a half speed control lever configured substantially parallel with the output shaft; one end of the half speed control lever is configured near the half speed control switch and the other end of the half speed control lever is configured close to the mounting position of the at least two different stirring tools; the half speed control lever is capable of moving along a direction parallel with the output shaft to trigger the half speed control switch;

wherein one of the half speed control lever and the reverse control lever is more close to the output shaft than the other; one of the at least two different stirring tools is capable of lifting the half speed control lever to trigger the half speed control switch when the one of the at least two different stirring tools is connected to the body.

4. The hand blender of claim 3, wherein the switches comprises a safety switch and a starting switch; the safety switch and the starting switch are connect in series between a power supply and the motor; only when both the safety switch and the starting switch are pressed, the motor is powered to operate.

5. The hand blender of claim 4, wherein an inner ring of the one way bearing engages with the output shaft, and the outer ring of the one way bearing engages with the deceleration component.

6. The hand blender of claim 1, wherein the lower planet carrier and the low speed output connector are integrated together; the lower planet carrier is configured at an upper end of the low speed output connector.

7. The hand blender of claim 6, a bearing is sleeved on an outside surface of the sun gear to make the sun gear, the planetary gear set and the planet carrier coaxial.

8. The hand blender of claim 7, wherein the at least two stirring tools are chosen from an egg beater, a potatoes blender, a chopper and a blender.

* * * * *